May 2, 1939.  G. F. HURT  2,156,291

CLEANING OF FILTER BEDS

Filed April 7, 1937  4 Sheets-Sheet 1

INVENTOR:
George F. Hurt
BY
Morrison Kennedy + Campbell
ATTORNEYS.

May 2, 1939. G. F. HURT 2,156,291
CLEANING OF FILTER BEDS
Filed April 7, 1937 4 Sheets-Sheet 3

Patented May 2, 1939

2,156,291

UNITED STATES PATENT OFFICE 2,156,291

CLEANING OF FILTER BEDS

George Fletcher Hurt, New York, N. Y., assignor, by mesne assignments, to Jig-Action Filters, Inc., a corporation of New York Application April 7, 1937, Serial No. 135,463

18 Claims. (Cl. 210—128)

This invention relates to cleaning of filter beds, and includes both method and apparatus therefor; a typical instance being the cleaning of the granular or sand filter beds used in sewage filtering. The invention is herein illustratively shown applied to a sewage filtering system of the kind in which the bed is immersed between the watery influent liquid to be filtered and the filtrate liquid, with downflow or upflow through the bed; especially a filter of the downflow type, the raw or dirty liquid passing down through the bed maintained on a submerged supporting screen; the cleaning action and means preferably traveling over the bed progressively, or operating section by section, during continuous filtering; but the principles of the invention may be useful on various types of immersed bed filter, with or without travel, and combined or not with a preparatory settling reservoir. In referring to sand or granular filtering medium is intended any hard small particles or grains, as of sand, rock, glass, metal or crushed mineral in loose form, and considerably heavier than water.

The known art comprises several kinds of cleaning operations for downflow or upflow filters, with various principles of action, such as mechanical, hydraulic, magnetic, or combinations, and with various types of set-up or rig, of which some are described in an article on Mechanical filtration of sewage by P. B. Streander in the periodical Water Works & Sewage for July 1935. In a typical form of cleaning system heretofore known, one section of the filter bed is cleaned at a time, the cleaning action being repeated at short intervals and the cleaning means or rig being travelled progressively over the bed, section by section, so that the entire bed is acted upon within a predetermined period. The cleaning action proper usually comprises the agitation of the sand of each successive section accompanied by upflow of the water in that section, which actions together are intended to loosen the bed and detach from the sand the relatively lighter material or "floc" that tends to clog the bed, the floc being carried up with the upflowing liquid and beyond the top level of the bed toward an overflow point or weir. After each such cleaning action the liquid quickly subsides to its normal level, and the relatively heavy filter sand settles quickly back to the bed. The foreign material or floc, at each section of the bed is with difficulty separated and carried away, thus requiring, at each upflow, that a large volume of water be carried up and overflowed, sufficient to discharge all the floc lifted in that upflow. The removed water and floc in very low concentration thus enter a discharge compartment, whence they are removed to a suitable separation or disposal place, while the cleaned section of filter bed resumes its office and the cleaning action progresses on to a succeeding section. Each of the known systems operating on these principles has the above mentioned and other disadvantages, and none is entirely satisfactory.

The general object of the present invention is to afford a satisfactory filter cleaning method and apparatus that will be highly efficient and economical as well as simple and convenient of operation and control. A further object is to secure thoroughness and uniformity of cleaning. A particular object is to dispense with certain complications by making use of pneumatic action to cause a "jigging" water motion and uniform up and down surges, at each section of the filter bed; and thus to cause repeated and cumulative separations of alien solids or floc from the sand, and permitting progressive removal of the floc to a designated place, with improved efficiency, and higher concentration.

Other objects and advantages will appear in the herein following description of an illustrative embodiment of the invention. To the attainment of such objects and advantages the invention consists in the novel method of cleaning filter beds and the novel apparatus therefor, and the features of operation, combination, arrangement and structure herein illustrated or described.

In the accompanying drawings

On the accompanying drawings the liquids are designated by distinctive references, as follows.

The influent or incoming liquid to be filtered is designated A, and after it passes through the filter, preferably downwardly, it becomes the filtered liquid or filtrate B. A part of the liquid below the filter is by this invention drawn upwardly through the filter and constitutes diverted liquid taking part in the cleaning of the filter, and is designated C. The varying levels of the liquids A and C are indicated by small reference letters as hereinafter set forth.

Figure 1:
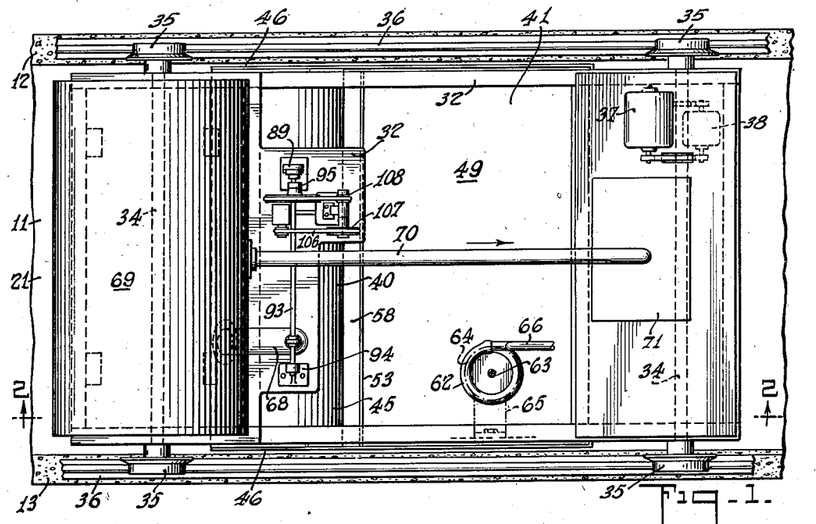
Fig. 1 is a top plan view of a filter cleaning apparatus embodying the present invention.
Figure 3:
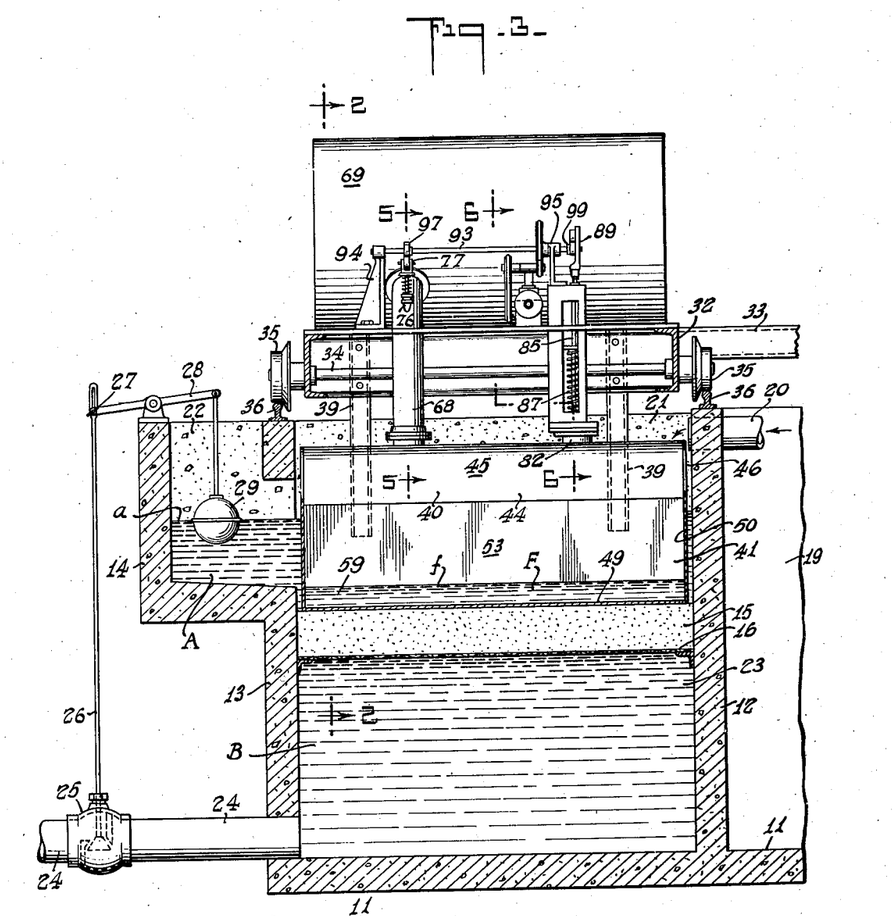
Fig. 3 is a right end elevation and vertical section taken on the line 3—3 of Fig. 2.
Figure 4:
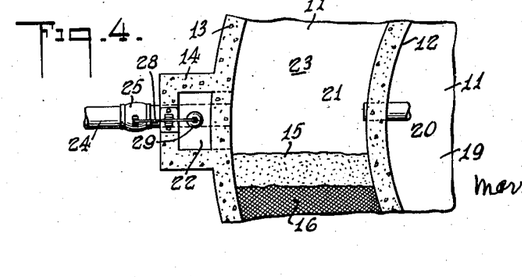
Fig. 4 is a partial top plan view showing certain parts of Fig. 3 not appearing in Figs. 1 and 2, on a smaller scale.

While the apparatus as a whole may take various forms, such as elongated, with the actions shifting longitudinally to and fro, a circular form of filter chamber is preferably used, as will be apparent by considering Figs. 3 and 4, permitting the actions to travel around and round. The curvature shown in Fig. 4 is for convenience omitted from the top view Fig. 1. An underlying element is the concrete base 11 which may rest on suitable foundations. An inner or rear upstanding wall 12 and an outer or front wall 13 constitute an annular filtering vessel. The outer wall 13 may at one point have an outward extension or niche 14 affording a supplemental space for regulation purposes.

The filter bed 15 is shown as submerged, being carried upon a screen or mesh 16 and thus suspended between the body A of influent liquid and the filtrate B. The filter bed may be composed of sand, crushed minerals or other finely divided materials suitable for the purpose. The sand 17 and foreign matter or floc 18 are shown diagrammatically in Fig. 8.

A central reservoir 19 is indicated which may be utilized for preliminary clarifying or settling of the liquid to be filtered. This is shown as having an overflow in the form of a pipe 20 delivering into the annular filter chamber 21 between walls 12 and 13. The overflow pipe 20 is in the nature of a weir and may be repeated at various points around the apparatus. The filter chamber 21 has an extension within the niche 14, forming a control chamber 22 useful for the operation of a device or float to regulate approximately the unfiltered liquid depth or level in the filter chamber.

The filtrate chamber 23 below the filter is shown as delivering by an outlet pipe 24 which may pass to a convenient point of disposal of the filtered liquid. In the outlet is shown a control valve 25 having an operating stem 26. As arranged the stem 26 is to be lifted to close further the valve, and vice versa. At its upper end the stem 26 is connected by an adjustable pivot 27 with an overhead or walking beam lever 28 fulcrumed on the wall 14. The inner end of the lever 28 extends over the control chamber 22 and from it depends a float 29 partly immersed in the liquid A to be filtered.

By this control arrangement, when the liquid to be filtered is received at an excessive rate, tending to raise its level, the float 29 lifts and the valve 25 correspondingly opens, thus causing a more rapid delivery from the filtrate chamber, consequently an increased rate of filtering, and a lowering again of the level $a$ of the liquid to to be filtered. If the level $a$ tends to drop excessively the valve 25 may be entirely closed, suspending the filtering action until further supply is received. Thus the general influent liquid level is maintained reasonably steady.

The filter chamber 21 then extends annularly between the front and rear walls 13 and 12. These walls may be used for support of a suitable cleaning apparatus to travel progressively around the annular chamber. Thus a traveling carriage 32 is shown built up of longitudinal and transverse channels or other structural members. In Fig. 3 is shown a radial beam or bar 33 which may be extended from the carriage to a central pivot point, thus holding the carriage in proper relation to the chamber as it advances. The carriage is shown as provided with axles 34 carrying wheels 35 running on tracks 36 mounted at the tops of the walls 12 and 13 respectively. Having to travel further the front or outer wheels may be larger than the inner ones in the same proportion as the respective radii from the center of the apparatus. In order to render self propelling, at a slow speed, the carriage and supported apparatus, a motor 37 is shown mounted on the carriage and connected by reduction gearing 38 to the wheel axles 34.

The carriage 32 is used to support the cleaning part of the apparatus. There are shown four depending legs or hangers 39, two at each side of the carriage, and giving support to the submerged or partially submerged elements of the apparatus comprising what may be referred to as the caisson element 40, closed over its top, and the tank element 41 closed underneath and preferably open at the top. These combined elements are to be vertically adjustable so as to set them in proper relation to the top surface of the filter bed 15; and such adjustment may be by means of the hangers 39 or by changing the relation of the carriage to its wheel axles. The carriage may be considered a traveling bridge from which hang the cleaning elements that progress along immersed in the influent liquid above the filter bed.

The caisson element 40 is shown as having a transverse wall 43 extending to the full depth of the influent liquid, and a second transverse wall 44 spaced from the other but extending short of the full depth, and constituting a lute under which the liquid may flow. Connecting the caisson sides 43 and 44 is a closed top 45, preferably arched, and the ends are closed by longitudinal walls 46. By this housing construction the caisson element constitutes an inverted container or tank, operating as a bell or caisson. For the smooth travel of the wall 43 over the filter bed the foot of this wall is shown as bent at 47 to afford a substantial area of contact upon the bed.

The tank element 41 is formed with a bottom wall 49 at substantially the level of the foot 47 and traveling closely over the filter bed. End walls 50 may constitute continuations of the end walls 46 of the caisson, these two elements being thus combined as a rigid unitary apparatus. A transverse upright wall 51 is located inside the caisson, forming a weir, and at its extreme other end is a similar upright wall 52, completing the tank. Between these is an intermediate transverse wall 53, exterior to the caisson, also constituting a weir.

These described elements, partly submerged, provide a series of chambers which may be described as follows: Within the main part of the caisson 40 is the cleaning chamber 56, accommodating the cleaning liquid or water C. This chamber is formed between the upright walls 43 and 51. The liquid is shown at a low level $c$, and a high level $c'$ is indicated at which the surplus liquid overflows the wall or weir 51 into the next or overflow chamber 57. The lower opening or mouth 55 of the jig chamber 56 constitutes a wide entrance or slot for the cleaning water as it is sucked pneumatically up from the filter bed in each repeated cleaning operation.

The overflow chamber 57 is enclosed between the upright walls 51 and 44. It receives the liquid overflowing the weir 51 and there is indicated its low level $d$ and a high or maximum level $d'$. From the chamber 57 the liquid may pass under the wall 44, which acts as a lute, the liquid thus entering the discharge chamber 58 provided between the walls 44 and 53. In the discharge chamber the low and high liquid levels are indicated at $e$ and $e'$. From the discharge chamber the liquid overflows the wall or weir 53 into a receiving chamber or compartment 59 which may be referred to as a wash-water tank or sump, accommodated between walls 53 and 52 and the liquid within which may vary in level, for example between low level $f$ and high level $f'$. A definite mode of travel of the cleaning liquid and the alien matters or floc entrained by it is thus indicated in accordance with this invention.

The discharge chamber 58 is preferably of smaller section than the overflow chamber 57. It is shown about half the section thereof, so that when the water rises from level $d$ to $d'$ in chamber 57 it will tend to drop twice as far, from $e'$ to $e$ in chamber 58; thus creating a head between them tending to prevent water in chamber 57 rising enough to overflow back into chamber 56. The normal level $d$ is the same as $e'$, determined by the discharge weir 53. The level $e'$, or height of weir 53 may be either higher or lower than the outside liquid level $a$, within the purposes of this invention; but the level $c'$, or height of weir 51, must be substantially higher than weir 53 and at least as high and preferably higher than the level $a$.

The sump or wash-water chamber 59 is required to be progressively discharged to make room for further accretions. For this purpose there is shown provided a pump 62 submerged below the low level of liquid in the sump. The pump 62 may be of the centrifugal type, suitably mounted near the bottom of the tank, with an operating shaft 63 extending upwardly to a pumping motor 64 mounted on a bracket 65 on the traveling carriage 32. The sump pump discharges upwardly through a pipe 66 which may be carried to any desired point of disposal. The liquid F in compartment 59 is thus kept between levels $f$ and $f'$.

With this invention it is essential to have the pneumatic jig or cleaner chamber 56 and means progressively to remove cleaning liquid from it by outflowing the tops of the upsurges therein either at every cycle or periodically. The jig chamber may have any shape, though its walls are shown preferably upright. The progressive removal means preferably comprises the overflow chamber 57, in a location to receive from the jig chamber, combined with means to remove excess liquid from the overflow chamber, without admitting air. This last removal means is shown as comprising the discharge chamber or column 58, with an immersed passage between them constituting a seal or trap against admission of air to the caisson. Preferably also there is the fourth chamber or wash-water compartment 59 beyond. The chambers 58 and 59, however, could be combined as one by having the pump 62 remove excess liquid directly from the former; but it is preferable to separate the functions of the third and fourth chambers, the weir 53 keeping the former substantially full notwithstanding that the pump sometimes may nearly empty the latter. Between chambers 57 and 58 may be means to retard or prevent undue liquid backflow, as a check valve, precluding return of overflow liquid back to the jig chamber. The walls 51 and 53 may be considered parts of the caisson, with the wash-water compartment beyond them, and its walls preferably are higher than the wall or weir 53.

As will be more fully described the jigging or surging action within the cleaning chamber 56 is herein provided by methodically varying the interior air pressure over the cleaning water, as by intermittent applications of pressure change or pneumatic suction. The upper part of the top wall 45 of the caisson is shown as having coupled with it an air pipe 68. This is of substantial diameter, and for more prompt results there may be several of these suction or air outlet ducts along the length of the caisson, operated in unison. The suction pipe 68 is shown as extended vertically and then bent slantingly, and its end is coupled with a vacuum tank 69 mounted at a convenient point on the carriage 32. The suction tank is preferably many times the volume of the caisson air space 54, above the liquid, and there may be maintained in the tank a moderate state of evacuation by means of an exhausting pipe 70 extending from the tank to a motor-driven vacuum pump 71. The suction pump 71 may be of any suitable type, as the Root blower, a rotary pump with self-contained drive motor. This is to be regulated in action, by change of speed or by a valve in duct 70, so as to maintain a predetermined degree of evacuation in vessel 69, preferably under the control of the pressure in the vessel, which is to be somewhat lower than, or its suction slightly higher than, that desired to be applied to chamber 46. Such regulation of pressure may be on well known principles. The vacuum in the tank may also be varied automatically by reducing the suction slightly when the water level $a$ rises, and vice versa, as by a float or control valve; this because less suction lift is needed when the influent level is higher.

The operation of this invention is to apply suction to the chamber 56 by opening the duct 68 at intervals, thus causing at each operation an upward surge of liquid in the caisson, followed shortly by a relief to atmospheric pressure, liquid resurge downwardly, and repetition of cycle. To afford the intermittent suction action each suction pipe 68 is shown as provided with a valve comprising an interior valve seat 73 underneath which engages a valve disk 74, the stem 75 of which extends upwardly through a stuffing box 76, and at the top having a head 77 carrying a cam follower or roll 78 operated automatically as will be described. Between the stem head and the stuffing box is a compressed spring 79 tending to lift and close the suction valve 74.

In addition to the exhausting pipe or duct 68 leading from the caisson there is a relief pipe 82 which, above, is shown open to the atmosphere so as to admit air as at atmospheric pressure to restore pressure conditions after each application and discontinuance of suction. The relief pipe 82 may be quite short, and is formed, near the caisson, with a valve seat 83 above which is engaged a valve 84, the upwardly extending stem 85 of which passes through a guide 86, with a compressed spring 87 between the valve and guide, tending always to close the valve. The upper end of the stem 85 passes through the upper part of a guide bracket 88, which also carries the guide bar 86. At the top of the stem is an enlargement or head 89 which passes above and is vertically slotted to accommodate the cam shaft 93 to be mentioned. The head 89 carries above the shaft a cam follower 90, the lifting of which opens the valve 84.

The suction valve 74 and the relief valve 84 are to be operated in coordination to apply suction and pressure alternately to the caisson air space 54 above the cleaning liquid C therein. Instead of relieving the exhaustion or partial suction of the caisson by admitting atmospheric pressure by the valve 84, manifestly air under elevated pressure may be admitted by the opening of this valve; and the air pump 71, above described, while providing a suitable degree of suction for the valve 74 may at the same time provide air pressure for the valve 84. The two valves are intended to be operated in harmony so as to effect the surging upwardly and then downwardly of the cleaning water in the caisson, preferably with a rhythmic motion.

For the automatic operation and coordination of the suction and relief (or pressure) valves there is shown an operating shaft 93 turning in a front bearing bracket 94 and a rear bracket 95. This shaft carries a cam 97 for operating the suction valve 74, the cam having an elevation 98 with a short dwell which, when in effect, holds the valve open against spring 79 and air pressure. The shaft carries also a cam 99 for operating the relief valve 84, this having an elevation 100 with a prolonged dwell holding open the relief valve against its spring at a time when the suction valve is closed. The coordinated cams 97 and 99 operate respectively on the followers 78 and 90 to open the respective valves in predetermined alternation.

The cam shaft 93 may be rotated at a suitably slow speed, as two or three turns per minute, more or less, by means of a drive motor 102 mounted on the carriage 32. This is a regulable electric motor so that the shaft speed may be adjusted to the desired actions. The motor shaft 103 is shown operating through a conventional reducing-gear-box 104, the shaft of which carries a small pulley 105 which operates through a belt or chain 106 to drive a larger pulley 107, thus affording further speed reduction. The shaft of pulley 107 carries also a small pulley 108 which drives a belt 109 extending to a large pulley 110 on the cam shaft 93.

The contours and relative positions of the cams 97 and 99 on the cam shaft determine the timing of the operation of the valves, and the cams may be changeable or adjustable. The shaft turning clockwise in Figs. 5 and 6, the relief valve 84 has closed, and both valves are closed, but shortly the suction valve will be opened by the cam 97, this being a quick opening, affording a sudden application of suction and starting the upward surging movement or pulsation in an abrupt manner highly effective for the opening up of the filter bed structure and the dislodging or scrubbing of the floc from the heavier sand particles.

The disclosed apparatus may be modified to extend the filter chamber, namely, by reducing the diameter of chamber inner wall 12 until it is but a central abutment or circular pier, solid or hollow, thus eliminating the clarifying reservoir 19. In such case the traveling carriage or bridge 32 will be substantially of the full radius of the well 13. The traveling caisson 40 and tank 61 will then be substantially of sector shape, each reaching from peripheral wall to central pier, and the suction mouth 55, of similar shape, will progressively reach every section of the filter bed for cleaning thereof.

While the operation of this invention has been generally indicated it requires elaboration to explain fully the principles of the invention. The sewage may come to the filter as the raw dirty liquor, without clarification; or it may be first clarified and then come to the filter as influent containing say between 90 and 120 parts or pounds per million of floc or suspended solid matter in the water, and this influent may then be filtered approximately to a condition of only 20 to 30 parts per million, proper for discharge. The heaviest and lightest impurities having been readily removed by previous settling and flotation, the floc to be handled is nearly of the specific gravity of water and therefore troublesome. While the influent is shown entering the annular filter chamber or vessel from the center and the effluent leaving peripherally these flows may be reversed or variously arranged.

The influent liquid A is maintained approximately at the depth or head $a$ by the automatic valve 25, this steady depth being important since the cleaning operations are dependent upon the maintenance of approximately correct relative levels in the filter chamber 21 for the best action. The head $a$ may be adjusted by means of the device 27 between the valve stem and float lever. The depth may be say 15 inches about a 9 inch filter bed. The depth $a$ above the filter also affords the head for filtering purposes. The accumulating floc or fine solid particles or flakes gradually occupy and block the interstices at the upper side of the filter bed, clogging the flow through it and impairing its capacity. This gradual increase in the loss of head through the filter is offset by the gradual opening up of the valve 25, so that the level $a$ of influent liquid may be maintained.

The cleaning of the filter bed herein is by what may be described as a pneumatic jig action, involving alternate induced upflow or surge and downsurge of the cleaning liquid or water C through that portion of the filter bed which is beneath the mouth 55 of the cleaning chamber or caisson. By varying methodically the interior air pressure between a relatively depressed and a relatively elevated pressure, preferably by the alternate application of air suction and relief, these surging motions are brought about preferably with a substantially rhythmic rise and fall, each outrush of air starting the upflow of cleaning water and the subsequent air inrush causing the return or downflow. The motions are of course the resultant of the interior pressures, the exterior or atmospheric pressure and the hydraulic head, modified by the retardation of flow through the filter. The complete cycle may be varied in period according to requirements, and there may be for example several cycles per minute, or between about 10 and 40 seconds to each cycle. The optimum period for each cycle, under given conditions, is readily determined by tests, and will depend on the factors already mentioned including the nature of the floc, and the character of the filter bed, i. e. the size and specific gravity of the filter grains or sand.

For description, the suction tank, pipes and valve may be considered as a pneumatic means to apply depressed pressure to cause water upflow at intervals; while the relief valve is a relief means to cause pressure elevation of water downflow. The valve cams and their drive constitute an automatic means or timed mechanism for causing coordinated valve operations and consequent water upflow and downflow with methodical overflows; and preferably with a dwell or pause before each relief or downflow to promote overflow and afford more time for the heavy filter grains to return to the bed.

Figure 8:
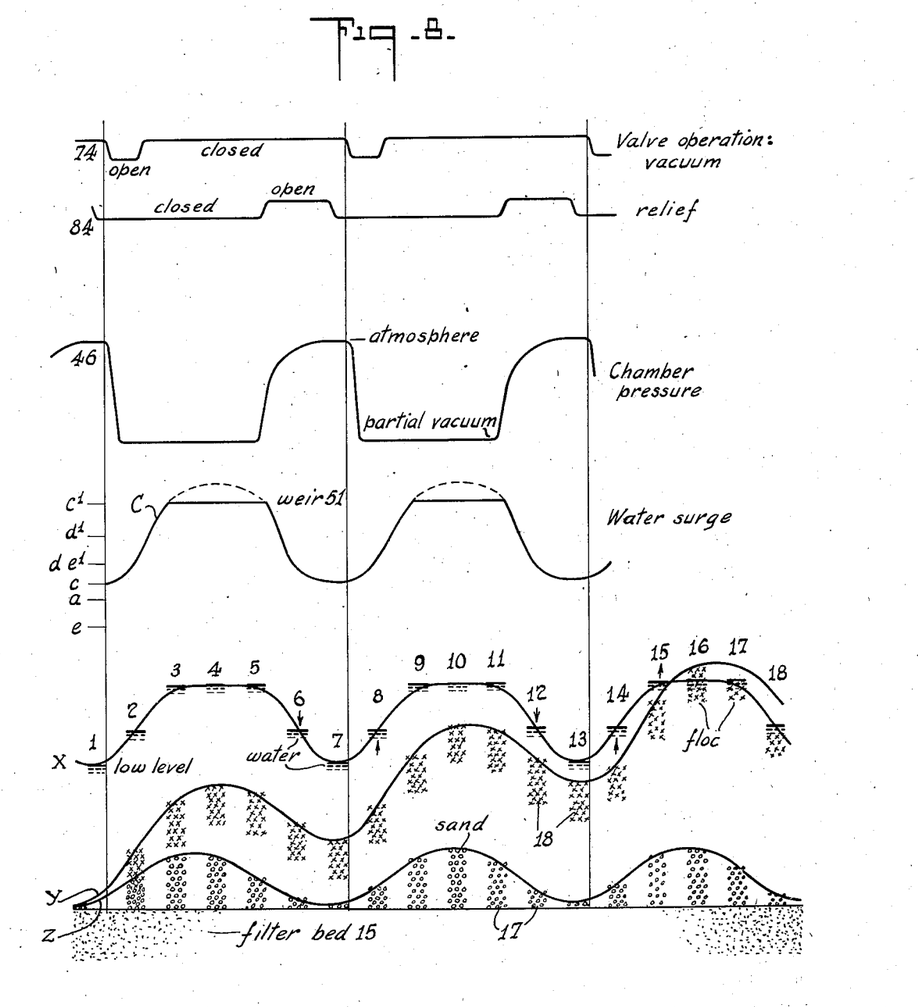
Fig. 8 is a diagram illustrative of the preferred character of actions.

The action of the illustrated apparatus may be explained upon the diagram Fig. 8. The suction tank 69 may have a volume much larger than, for example eight times, the normal volume of the suction space 54 in the jig chamber 56. The pressure within the tank may be maintained subatmospheric to the extent of say about 9 inches of water column, so that when the valve 74 opens to connect the tank and chamber the resulting suction will be slightly less or about that of a column of 8 inches of water, more or less, which may fall off somewhat as the water then rises. Much greater air pressure variations may be used to give more emphatic actions.

Figures 5, 6, 7:
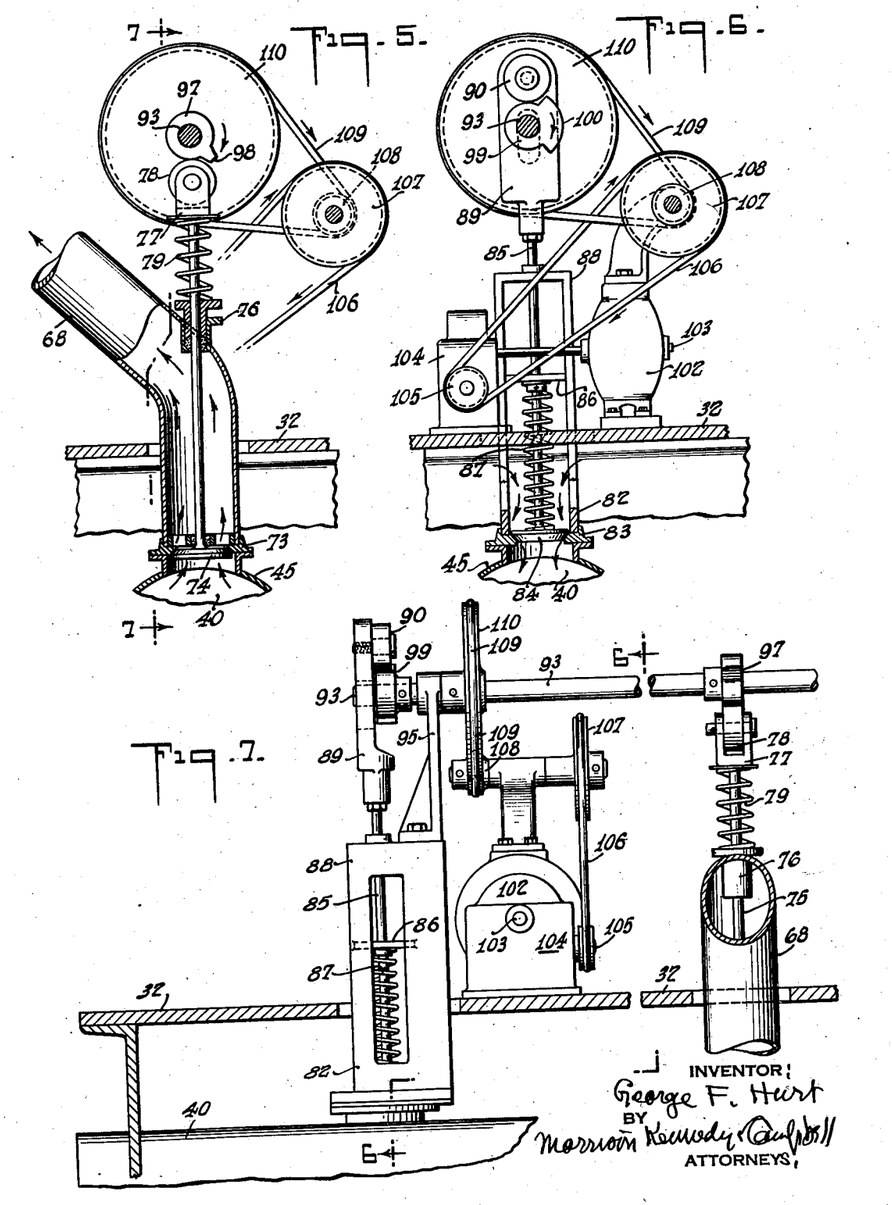
Fig. 5, on a larger scale, is a front elevation of certain operating parts of Figs. 1 to 3, partly in vertical section on the line 5—5 of Fig. 3, showing the suction valve.
Fig. 6 is a similar front elevation on the line 6—6 of Fig. 3, showing the relief valve.
Fig. 7 is a partial left elevation partly in vertical section on the line 7—7 of Fig. 5, showing both valves.

On Fig. 8 the cycles are represented between vertical lines, each line representing what may be called the initial position, that of Figs. 5 and 6. The top two diagram lines show the valve actions, both valves being initially closed. The vacuum valve 74 first opens, preferably suddenly, and within 60° of cam advance it closes again as shown. After about 180° further rotation the relief valve 84 opens, and it remains so until it closes just before the completion of the cycle. These specific descriptions it is to be understood are merely of an illustrative example.

The chamber air pressure within space 54 of the cleaner chamber 56 will be initially atmospheric, if compressed air be not used. As valve 74 opens the pressure drops rapidly from atmospheric to the minimum, as the next section of the diagram shows, air rushing out through the valve to the tank until the suction is equalized, as at 8 inches of water column. Here the depressed pressure is retained because both valves remain closed. When valve 84 next opens to relieve the suction, air flows in and the pressure rises first abruptly and then more gradually until initial or atmospheric pressure is restored before the relief valve closes again near the cycle end.

The diagram in the next section below shows approximately the upflow and downflow of the cleaning water in the chamber and through the filter. With the pressure drop, when valve 74 opens, the liquid level rises. Starting gradually the rise accelerates, and then decelerates, and beyond the maximum, when pressure is restored, the water resurges to its normal or low level. The action is smooth and may be roughly of sine character, substantially harmonic and continuous. The top of the diagram curve of water level is shown dotted, representing a theoretical maximum rise, which however is not reached, the rise being truncated by the weir 51. Across the top of this weir a substantial portion of liquid overflows at the apex of each cycle, and falling into the overflow chamber 57 can not return, but eventually underflows the lute or seal wall 44 into the discharge chamber 58 and thence to the wash water compartment 59. Thus, portion by portion, with a high percentage of entrained floc, the cleaning liquid escapes and is discharged for separate disposal. In chamber 56 the water may never quite descend to the outer level $a$, its descent being interrupted by the next upsurge, and minimum level $c$ is therefore shown slightly above influent level $a$.

The action on the filter sand and associated floc is that with each upsurge of water in the cleaning chamber 46, the water, sucked from below through the filter bed, as the arrows show on Fig. 2, tends to lift all the solids, loosening up the bed, separating the sand grains, especially in the top stratum, giving access to the alien matters and floc, causing detachment of floc from sand grains and entraining all the solids upwardly into the chamber. A differential lifting action however prevails since the gravity of the filter grains is substantially greater than that of the dislodged floc. The floc rises more freely and higher, while the sand grains in fact commence at once a relative descent or sinking through the rising current of water. This stage is followed by an intervening stage in which the water is static and the sand grains substantially complete their return to the bed. When the resurge commences the filter grains are well below the higher portions of floc, and promptly resume their place in the bed, while the floc or the major part of it remains in elevated suspension.

Such differential action is repeated in each cycle, several times per minute, the floc relatively gaining upward progress at each action, and the peak of each action carrying over the weir 51 the cap of the upsurge with the entrained floc. The action or frequency is arranged so that the filter grains will sink faster than the net water upflow rate and thus can never reach the weir nor be lost permanently, while the advancing rise of the lighter floc is cumulative, exceeding each descent. These actions are completely distinguished from a known system in which the sand is caused to rise and the water relies on this for its rise and the floc relies on the water for its rise; the floc being thus handicapped in favor of the sand, causing inefficiency in getting the floc above the sand to overflow differentially, the wash-water being floc-poor.

In the final or lowest section of the diagram Fig. 8 is attempted to be roughly indicated the differential action by which the floc is caused to rise relatively to the heavier sand in each cycle of upsurge and downsurge in the jig chamber. The truncated water-surging action through several cycles has been explained, that part of the water rising above the weir level being caused to overflow into the overflow chamber. Beneath this water surge diagram is shown a series of successive diagrammatic views or columns of the theoretical action, with six thereof to the cycle. The sand grains are indicated by small circles and the floc particles by crosses, and the water by horizontal lines.

At position 1, showing a theoretical column, the water level is normal or low, and floc 18 and sand 17 have not been acted on. Column 2 is taken at a midway point of upsurge, the water, floc and sand rising. A given small collection or group of sand grains is assumed, and a group of floc particles, and travel is ignored. The floc has ascended somewhat faster and higher than the sand, though they are partly intermingled. At column 3, the upsurge continuing, the differentiation is more apparent, and while both floc and sand have risen, the latter is seen to have relatively sunk in the rising water. Column 4 represents the apex of upsurge; and rise of floc and sand ceases. Between positions 3 and 5 the peak of the upflow passes over the weir. The suction holds up the water throughout this portion of the cycle. From positions 5 to 6 and to 7, completing the cycle, there is downflow, the sand resuming its position in the bed and the floc group partially descending. Through all cycles the sand acts as described, being lifted but sinking and returning to the bed. The floc however having gained ascent starts the second cycle with this advantage, as shown.

The second cycle greatly emphasizes the differential action, as the floc group now starts from a higher initial level. At positions 8 to 9 to 10 the upsurge carries the floc rapidly toward the weir level, while the sand rises only partly, as at positions 2, 3 and 4. At positions 11, 12 and 13 the floc group moves somewhat downward with the downsurge, but this time its lowest level will be substantially higher than at position 7; while the sand again returns substantially to the filter bed.

In the third cycle the floc, starting well elevated, rises rapidly with the upsurge through positions 14, 15 and 16, so that at position 16 this floc group, or a substantial part of it, passes higher than the weir level and is therefore carried over by the water from the jig chamber to the overflow chamber. This is indicated by the distribution of the floc particles above and below the weir level at position 16. At position 17 the overflowed floc is omitted, and only a part of this group remains for the next downsurge.

Thus a principle of floc separation and disposal is indicated which continues cycle after cycle. When the given floc group has thus commenced the overflowing of the weir, the succeeding floc groups, following immediately the one depicted, will be subject to the same action; wherefore on every upsurge there will overflow a portion of water heavily laden with floc lifted relatively away from the filter bed sand. The cleaning apparatus progressing over the uncleaned bed a fresh collection of floc is presented, as for each cycle, and the cleaning water becomes more and more heavily laden with floc; so that a quite concentrated liquid passes from chamber 56 through chambers 57 and 58 to the wash water sump 59. The diagram lowest section for convenience has curves $x$, $y$ and $z$ applied indicating the theoretical or intended actions of the water, floc and sand respectively, as described.

The operation may be modified to enrich further the wash-water, namely, by reducing the extent of each upsurge to prevent substantial overflow, for several cycles, while the floc becomes more and more concentrated in the surging water, and then by a higher upsurge flowing this heavily impregnated liquid over the weir and to the sump.

Figure 2:
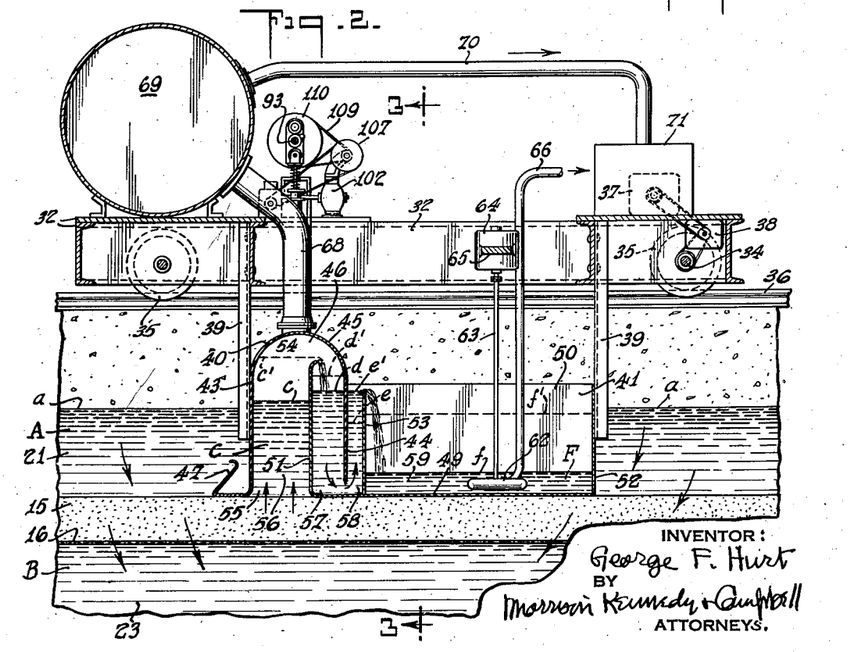
Fig. 2 is a front or outer side elevation and vertical section taken on the line 2—2 of Fig. 1 or Fig. 3.

The expected upper and lower water levels in each of the chambers 21, 56, 57 and 58 are indicated on the diagram Fig. 8 as well as on Fig. 2. These are in part theoretical or approximate, and are employed to indicate the principles of action. Low level $c$ in the jig chamber 56 may vary but preferably does not return to level $a$ in the filter chamber, being caught in the next lifting cycle. Level $c'$ is a maximum, determined by the weir 51. In the overflow chamber 57 the floc-laden liquid may not fall below level $d$, while it may rise to $d'$ by the suction above it, but must not pass back over the weir 51. The greater width of the chamber 57 compared with the discharge chamber 58 tends to create rapidly a retarding head upon rise of level in 57, and supplemental retardation may be provided. Chamber 57 therefore is always capacitated to receive a liquid portion over the weir 51. The column in chamber 58 cooperates. It may lower from the weir level $e'$ to low level $e$ due to suction rise in chamber 57. By these actions a discontinuous but substantial liquid advance is maintained through chambers 56, 57 and 58 to 59, with sufficient agitation to keep the floc entrained and prevent accumulation.

The described cleaning action on each successive section or zone of the filter bed is very effective. The suction is self-distributing, assuring uniform action over the whole area exposed at the suction mouth. Each water upflow acts upon the full depth of the bed. A forcible and abrupt lift is given such as is best to cause the sand to separate from the floc. The cleaning means hereof is simple, rugged and durable. It involves no mechanical operation or agitation to be carried on in the filter bed or suction chamber or below the water level; no water nozzles or jets are necessary, nor any special or expensive filter medium such as magnetic sand. Remote pneumatic control herein performs all the active functions. No special adjustments at the caisson have to be made, such as the levels of weirs. The action of the invention is adaptable to variations of conditions by simple adjustments effected at the traveling carriage; for example, slowing the cam speed and period of cycle thus giving ample time to ensure resettlement of sand, or speeding up for faster action with heavier sand; altering the degree of suction to regulate the surge and thereby the concentration of floc in the wash-water; relatively timing the cam actions, etc. The smoothness of the filter bed top surface is not disturbed since, with upright chamber walls, the depressed air pressure causes vertical upflow and all sand particles merely rise vertically and tend to descend to the same place in the bed.

I claim:

1. In a filter cleaning apparatus for a filter bed immersed between the influent water of liquid to be filtered and the filtrate, in combination, a partly immersed cleaner chamber having its upper part pneumatically closed above the general level of the liquid in which the filter is immersed and having an immersed open mouth closely above the filter bed, an overflow chamber and an overflow passage leading from the cleaner chamber to the overflow chamber for liquid overflow substantially above the general liquid level, a third chamber adapted to receive liquid from the overflow chamber and an underflow liquid passage from the overflow chamber to the third chamber, with means for removing liquid from said third chamber, a pneumatic means comprising a suction source and a suction passage between said suction source and cleaner chamber and a suction controller operable at intervals to apply suction to the cleaner chamber thereby to cause cleaning liquid upflow through the filter bed and upsurge within the cleaner chamber to overflow intermittently therefrom, a relief means comprising a passage between said cleaner chamber and the atmosphere and a relief controller operable after each liquid upflow to relieve the depressed pressure in the cleaner chamber thereby to cause liquid downsurge within the chamber and downflow thereof into the filter bed, and automatic means to operate said suction and relief controllers in coordinated alternation, thereby to cause successive upflows and downflows of cleaning liquid and methodical overflows from the cleaner chamber to the overflow chamber.

2. In a filter cleaning apparatus for a filter bed immersed between the influent water or liquid to be filtered and the filtrate, a partly immersed cleaner chamber having its upper part pneumatically closed above the general level of the liquid in which the filter bed is immersed and having an immersed open mouth closely above the filter bed, an overflow chamber and an overflow passage leading from the cleaner chamber to the overflow chamber for liquid overflow substantially above the general liquid level, a discharge chamber adapted to receive liquid from the overflow chamber and an underflow liquid passage from the overflow chamber to the discharge chamber whereby the overflow chamber is sealed against air inflow, said discharge chamber being of smaller sectional dimension than the overflow chamber whereby suction over the overflow chamber may not cause liquid reflow into the cleaner chamber, a pneumatic means for methodically varying the interior air pressure over the liquid in the cleaner chamber, thereby to cause successive upflows and downflows of cleaning liquid and methodical overflows from the cleaner chamber to the overflow chamber.

3. In a filter cleaning apparatus for a filter bed immersed between the influent water or liquid to be filtered and the filtrate, in combination, a partly immersed cleaner chamber having its upper part pneumatically closed above the general level of the liquid in which the filter bed is immersed and having an immersed open mouth closely above the filter bed, an overflow chamber and an overflow passage leading from the cleaner chamber to the overflow chamber for liquid overflow substantially above the general liquid level, means for removing excess liquid from a submerged part of the overflow chamber without admitting air thereto, a pneumatic means comprising a suction source and a suction passage between said suction source and cleaner chamber and a suction controller operable at intervals to apply suction to the cleaner chamber thereby to cause cleaning liquid upflow through the filter bed and rise thereof within the cleaner chamber to overflow partially therefrom, a relief means comprising a passage between said cleaner chamber and a source of suction relief and a relief controller operable after each liquid upflow to relieve the depressed pressure in the cleaner chamber thereby to cause liquid lowering within the chamber and downflow thereof into the filter bed, and automatic means to operate said suction and relief controllers in coordinated alternation, thereby to cause successive upflows and downflows of cleaning liquid and methodical overflows from the cleaner chamber to the overflow chamber.

4. In a filter cleaning apparatus for a filter bed immersed between the influent water or liquid to be filtered and the filtrate, in combination, a partly immersed cleaner chamber having its upper part pneumatically closed above the general level of the liquid in which the filter bed is immersed and having an immersed open mouth closely above the filter bed, a pneumatic suction means comprising a suction source and a suction valve between said suction source and cleaner chamber and operable at intervals to apply suction to the cleaner chamber thereby to cause cleaning liquid upflow through the filter bed and upsurge thereof within the cleaner chamber, a relief means comprising a valve between said cleaner chamber and a source of suction relief and operable after each liquid upsurge to relieve the depressed air pressure in the cleaner chamber thereby to cause liquid downsurge within the chamber and downflow thereof into the filter bed, automatic means to operate said suction and relief valves in coordinated alternation, thereby to cause successive upsurges and downsurges of cleaning liquid, and means for methodically flowing away from the cleaner chamber the top portions of such liquid upsurges.

5. An apparatus as in claim 4 and wherein the means for flowing away the liquid comprises an elevated weir, higher than the general liquid level, over which the tops of upsurges overflow from the chamber, with means preventing air inflow over such weir.

6. An apparatus as in claim 4 and wherein the means for flowing away the liquid comprises an elevated weir over which the tops of upsurges overflow from the chamber, with means preventing air inflow over such weir; and the automatic means is timed to cause upsurge to above the weir level, with pause or dwell there before relief and downsurge.

7. In a filter cleaning apparatus for a filter bed immersed between the influent water or liquid to be filtered and the filtrate, in combination, a shiftable cleaner chamber having its upper part extending above the normal general level of the liquid in which the filter bed is immersed and having an immersed open mouth closely above the filter bed, a pneumatic means connected with the cleaner chamber and operable at intervals to apply to the cleaner chamber a change of air pressure thereby to cause a surge of cleaning liquid within the cleaner chamber, a relief means connected with the cleaner chamber and operable to relieve the changed air pressure in the cleaner chamber thereby to cause reverse liquid surge within the chamber, automatic means to operate said pneumatic means and relief means in a cycle of coordinated alternation, thereby to cause successive upsurges and downsurges of cleaning liquid, with resulting upflow and downflow through the filter bed, and means for methodically flowing away from the cleaner chamber the top portions of such liquid upsurges.

8. An apparatus as in claim 7 and wherein the means for flowing away liquid comprises an outflow passage at such altitude as to permit overflow of the tops only of upsurges, and an air-sealed chamber into which the outflow passage delivers and having means for removing excess liquid.

9. An apparatus as in claim 7 and wherein said pneumatic means comprises an air tank of relatively large volume, with connection to said chamber and a control valve for said connection.

10. An apparatus as in claim 7 and wherein said pneumatic means comprises a suction tank of relatively large volume, with connection to said chamber and a control valve for said connection, and said relief means comprises an atmospheric connection to the chamber and a control valve therefor.

11. An apparatus as in claim 7 and wherein the pneumatic means comprises a pneumatic valve and the relief means a relief valve, and there are timed means for operating said two valves in coordination.

12. An apparatus as in claim 7 and wherein the pneumatic means comprises a pneumatic valve and the relief means a relief valve, and there are timed means for operaitng said two valves in coordination, arranged to maintain depressed pressure for a period in each cycle sufficient to hold up the liquid for an appreciable period at the top of each upsurge, during which the lifted filter medium returns toward the bed.

13. In a downflow filter the combination with an immersed sand filter bed, of a traveling cleaner chamber having its mouth close against the bed top surface, pneumatic valve means for providing air alternately at higher and lower pressures in the chamber, to cause up and down water surge in the chamber, a take off passage leading from the chamber for outflow of the tops of upsurges, and means for removing the water so outflowed.

14. Apparatus for cleaning a filter bed composed of grains of material substantially heavier than the liquid or water and immersed between the influent and filtrate liquids, comprising a cleaner chamber supported with its mouth closely adjacent the upper side of the filter bed, means for methodically varying the interior air pressure over the cleaning liquid thereby to cause the liquid to surge up and down in the chamber and through the bed, and means for progressively removing cleaning liquid from the chamber comprising a liquid outflow passage for flowing away therefrom the top portions of liquid upsurges.

15. The method of cleaning a filter bed composed of grains of material substantially heavier than the liquid or water and immersed between the influent and filtrate liquids, comprising maintaining a cleaner chamber with its mouth closely adjacent the upper side of the filter bed, methodically varying the interior air pressure over the cleaning liquid thereby to cause the liquid to surge up and down in the chamber and through the bed, namely, by alternately raising and lowering the chamber air pressure, and progressively removing cleaning liquid from the chamber by flowing away therefrom the top portions of liquid upsurges.

16. The method of cleaning a filter bed composed of grains of material substantially heavier than the liquid or water and immersed between the influent and filtrate liquids, comprising maintaining a cleaner chamber with its mouth closely adjacent the upper side of the filter bed, methodically depressing and elevating the interior air pressure over the cleaning liquid thereby to cause the liquid to surge up and down in the chamber and through the bed, and progressively removing cleaning liquid from the chamber by overflowing therefrom the top portions of liquid upsurges, and receiving the same in an air-sealed overflow chamber.

17. The method of cleaning a downflow filter having a bed composed of grains of material substantially heavier than the liquid or water and immersed between the influent and filtrate liquids, comprising maintaining a cleaner chamber with its mouth closely adjacent the upper side of the filter bed, and causing it to travel over the bed, methodically varying the interior air pressure over the cleaning liquid thereby to cause the liquid to surge up and down in the chamber and through the bed, and progressively removing cleaning liquid from the chamber by flowing away therefrom the top portions of liquid upsurges.

18. The method of claim 17 and wherein each cycle of operation is so conducted that the liquid upsurge is caused to open the granular bed, lift a group of filter grains and lift further a group of the lighter foreign matter, and so that the subsequent downsurge causes return of the grains to the bed while leaving the group of foreign matter higher up; whereby the foreign matter progresses upwardly in successive cycles and when attaining the top of an upsurge is caused to be flowed away from the chamber therewith.

GEORGE FLETCHER HURT.